(12) United States Patent
Rynearson, Jr. et al.

(10) Patent No.: US 7,815,030 B2
(45) Date of Patent: Oct. 19, 2010

(54) KEY HOLE SLOTS FOR CUSHIONED CERAMIC DRIVEN DISC ASSEMBLY INCORPORATING DIRECT BOND CUSHIONED CERAMIC FACINGS

(75) Inventors: Steven J. Rynearson, Jr., Angola, IN (US); Michael L. Bassett, Auburn, IN (US); Timothy B. Allmandinger, Roanoke, IN (US); Barry T. Adams, Leo, IN (US)

(73) Assignee: Eaton Corporation, Cleveland, OH (US)

( * ) Notice: Subject to any disclaimer, the term of this patent is extended or adjusted under 35 U.S.C. 154(b) by 574 days.

(21) Appl. No.: 11/895,236

(22) Filed: Aug. 23, 2007

(65) Prior Publication Data

US 2008/0023292 A1   Jan. 31, 2008

Related U.S. Application Data

(63) Continuation-in-part of application No. 11/396,445, filed on Apr. 3, 2006, now abandoned.

(60) Provisional application No. 60/841,081, filed on Aug. 30, 2006.

(51) Int. Cl.
  *F16D 13/64* (2006.01)
(52) U.S. Cl. ............................ 192/107 C; 192/52.6
(58) Field of Classification Search .......... None
  See application file for complete search history.

(56) References Cited

U.S. PATENT DOCUMENTS

| | | | |
|---|---|---|---|
| 2,002,285 A * | 5/1935 | Bechman | 192/107 C |
| 3,180,470 A * | 4/1965 | Binder | 192/107 M |
| 4,529,079 A | 7/1985 | Albertson | |
| 4,903,814 A | 2/1990 | Tomotake | |
| 4,951,793 A | 8/1990 | Hays | |
| 5,004,089 A | 4/1991 | Hara | |
| 5,048,659 A | 9/1991 | Tojima | |
| 5,092,443 A * | 3/1992 | Nomura | 192/107 R |
| 5,184,704 A | 2/1993 | Hays | |
| 5,452,783 A | 9/1995 | De Briel | |
| 5,727,665 A | 3/1998 | Gonia | |
| 5,857,551 A | 1/1999 | Yoneda | |
| 5,937,989 A | 8/1999 | Yoneda | |
| 5,950,791 A | 9/1999 | Asada | |
| 5,954,585 A | 9/1999 | Nagano | |
| 6,015,035 A | 1/2000 | Mizukami | |
| 2007/0181398 A1 * | 8/2007 | Bassett et al. | 192/55.62 |

FOREIGN PATENT DOCUMENTS

GB    2103733 A    2/1983

* cited by examiner

*Primary Examiner*—Rodney H Bonck
(74) *Attorney, Agent, or Firm*—Kevin M. Hinman (57) ABSTRACT

A clutch disc assembly for a friction torque device has a clutch damper assembly which includes a hub defining an axis of rotation and a concentric steel disc. The damper assembly includes a plurality of cushion elements fixed to the steel disc. First and second friction rings are disposed on opposite sides of the cushion elements and are rotatively fixed to the steel disc. First and second friction discs have an equal number of keyhole slots defining an equal number of arms. A friction pad is fixed to each arm, with friction pads on the first friction disc being in substantial alignment with the friction pads on the second friction disc.

2 Claims, 9 Drawing Sheets

KEY HOLE SLOTS FOR CUSHIONED CERAMIC DRIVEN DISC ASSEMBLY INCORPORATING DIRECT BOND CUSHIONED CERAMIC FACINGS

RELATED APPLICATIONS

This continuation in part application claims the benefit of U.S. patent application Ser. No. 11/396,445, filed Apr. 3, 2006 and U.S. Provisional Application 60/841,081, filed on Aug. 30, 2006, the disclosures of which are incorporated herein by reference.

FIELD OF THE INVENTION

The present invention relates to clutch disc assemblies. More specifically, the present invention relates to the mounting of friction materials on clutch disc assemblies and to the arrangement of friction material on a clutch disc assembly.

BACKGROUND OF THE INVENTION

Motor vehicle clutch driven disc assemblies, or simply clutch disc assemblies, employ friction material to define engaging surfaces which engage facing metal surfaces provided by clutch pressure plates, flywheels and/or intermediate plates. The friction material can be configured in a wide variety of arrangements. To cite two exemplary arrangement, the friction material can be in the shape of a single ring, or a plurality of friction pads. The arrangement selected depends on several factors, including but not limited to, the frictional characteristics of the friction material, the available surface area of the engaging surfaces, the diameter of the engaging surfaces, the available clamping forces, the required torque transmitting capability of the clutch, the rotational inertia of the friction material when applied to the clutch disc assembly and the wear characteristics of the friction material. Certain applications are best served by clutch disc assemblies employing a plurality of small arcuate sections of ceramic friction material fixed to a supporting ring shaped backer plate. It has been noted that with this configuration, the pads are subject to tipping during operation. The tipping results in incomplete clutch disengagements and an associated difficulty in shifting. It is desired to provide an arrangement for a clutch disc assembly which allows ceramic friction pads to be employed without generating the undesired tipping phenomenon.

SUMMARY OF THE INVENTION

The present invention provides an arrangement for a clutch disc assembly which allows ceramic friction pads to be employed without generating the undesired tipping phenomenon.

A clutch disc assembly for a friction torque device includes a clutch damper assembly, a first friction ring, a second friction ring and a plurality of cushion elements. The clutch damper assembly includes a hub defining an axis of rotation, a steel disc and a plurality of damper springs disposed between the hub and the steel disc. The first friction ring is rotatively fixed to the steel disc concentric with the axis of rotation. The first friction ring includes a first steel backer plate. The first steel backer plate has a first plurality of keyhole shaped slots radially extending from a location proximate to an inside diameter of the first backer plate to and through an outside diameter of the first backer plate. The slots define an equal plurality of arms with one friction pad bonded to each arm on a side opposite the steel disc. A second friction ring is rotatively fixed to the steel disc concentric with the axis of rotation. The second friction ring includes a steel backer plate. The second steel backer plate has a plurality equal in number to the first plurality of keyhole shaped slots radially extending from a location proximate to an inside diameter of the second backer plate to and through an outside diameter of the second backer plate. The slots define an equal plurality of arms with one friction pad bonded to each arm on a side opposite the steel disc, with the first friction pads and the second friction pads being in substantial alignment. A plurality of cushion elements equal in number to the first plurality of cushion elements are fixed to the steel disc and axially disposed between the friction rings.

Further objects, features and advantages of the present invention will become apparent to those skilled in the art from analysis of the following written description, the accompanying drawings and appended claims.

DETAILED DESCRIPTION OF THE PREFERRED EMBODIMENT

Certain terminology will be used in the following description for convenience in reference only and will not be limiting. For example, the terms "forward" and "rearward" will refer to directions forward and rearward of a transmission as normally mounted in a vehicle. The terms "rightward" and "leftward" will refer to directions in the drawings in connection with which the terminology is used. The terms "inwardly" and "outwardly" will refer to directions toward and away from, respectively, the geometric center of the apparatus. The terms "upward" and "downward" will refer to directions as taken in the drawings in connection with which the terminology is used. All foregoing terms mentioned above include the normal derivatives and equivalents thereof.

Figure 1:
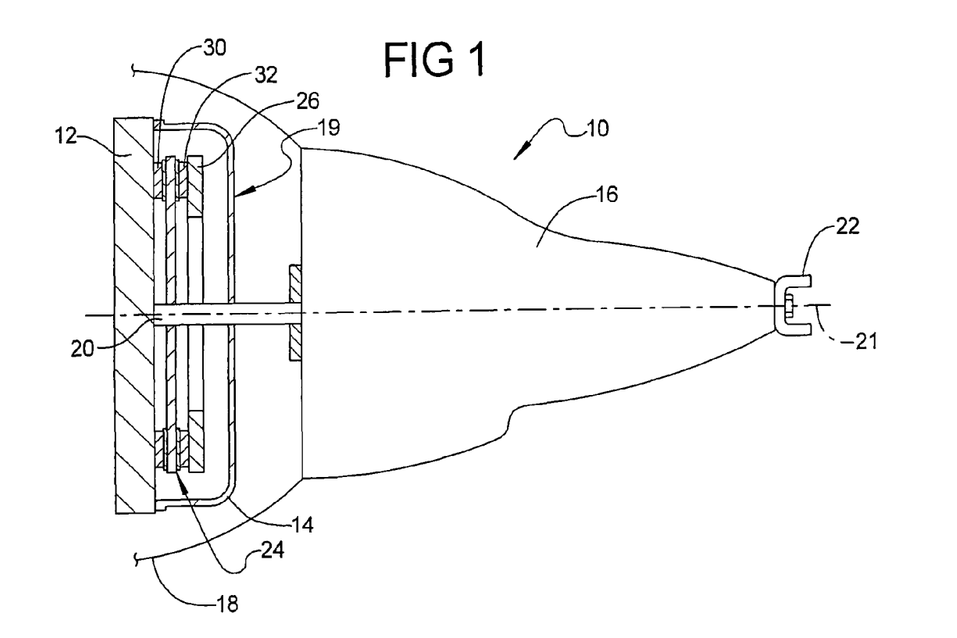
FIG. 1 is a side elevational view of and transmission and clutch illustrating the environment of the present invention.

Referring to FIG. 1 of the drawings, a partial cross-sectional view of a clutch/transmission assembly 10 is shown. An engine flywheel 12 is rotatably coupled to a clutch cover 14. A gear change transmission 16 is nonrotatably mounted to a bellhousing 18 which is mounted to an engine block (not shown). A clutch assembly 19 including clutch cover 14 and engine flywheel 12 is disposed within bellhousing 18. The transmission 16 is driven through the rotation of a transmission input shaft 20 about an axis 21 which eventually rotates a transmission drive yoke 22 which is attached to the balance of the vehicle driveline (not shown).

The transmission input shaft 20 is rotated by the flywheel 12 through frictional engagement of a clutch disc assembly 24 with flywheel 12. The clutch disc assembly 24 is typically nonrotatably slidably mounted to the input shaft 20 of the gear change transmission 16 and disposed between engine flywheel 12 and a clutch pressure plate 26 of assembly 19. Commonly shaft 20 and disc assembly 24 have complementary mating splines enabling disc assembly 24 to axially slide along shaft 20 while rotating as a unit therewith.

Figure 2:
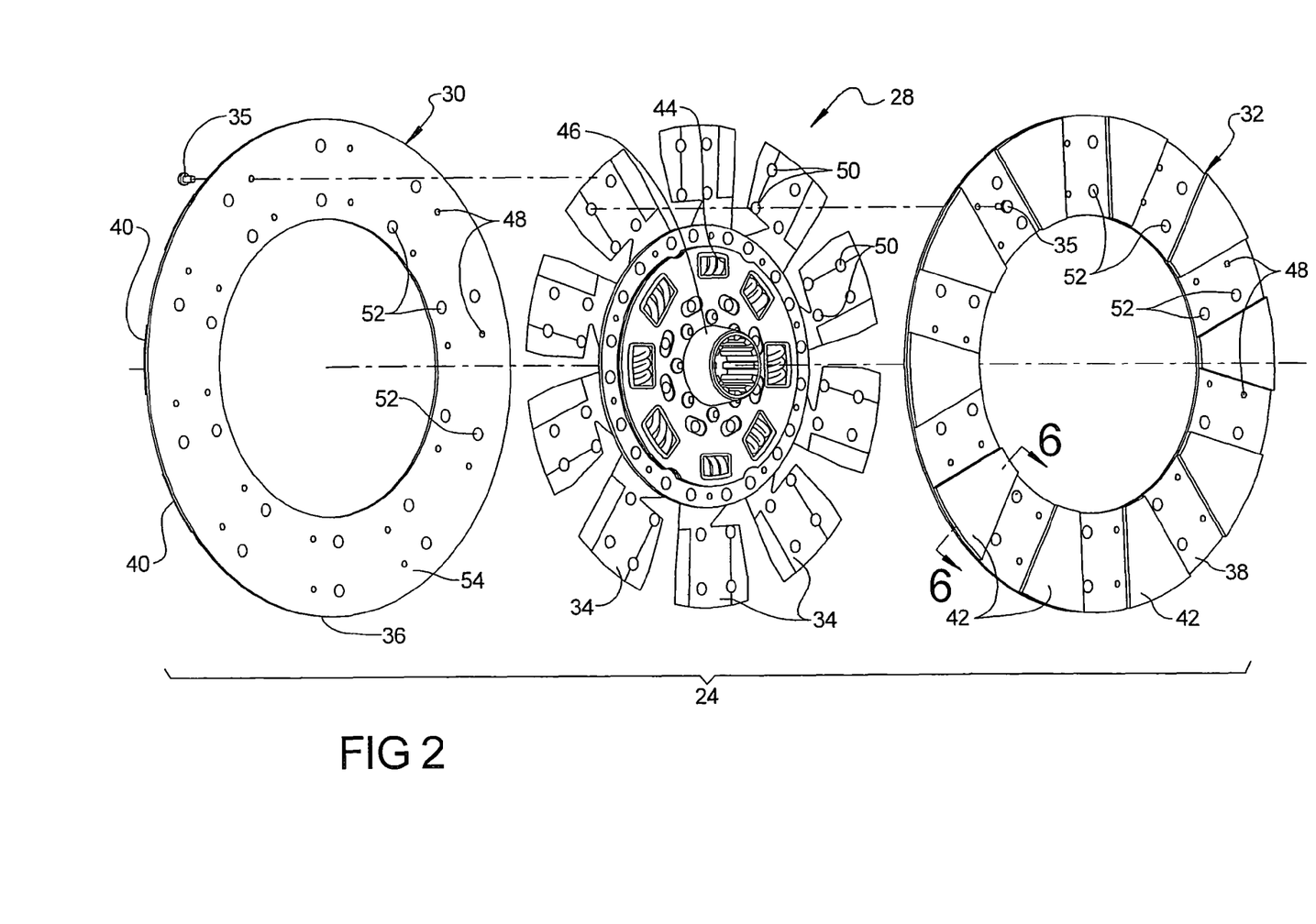
FIG. 2 is a partially exploded view of a clutch disc assembly of the present invention.
Figure 5:
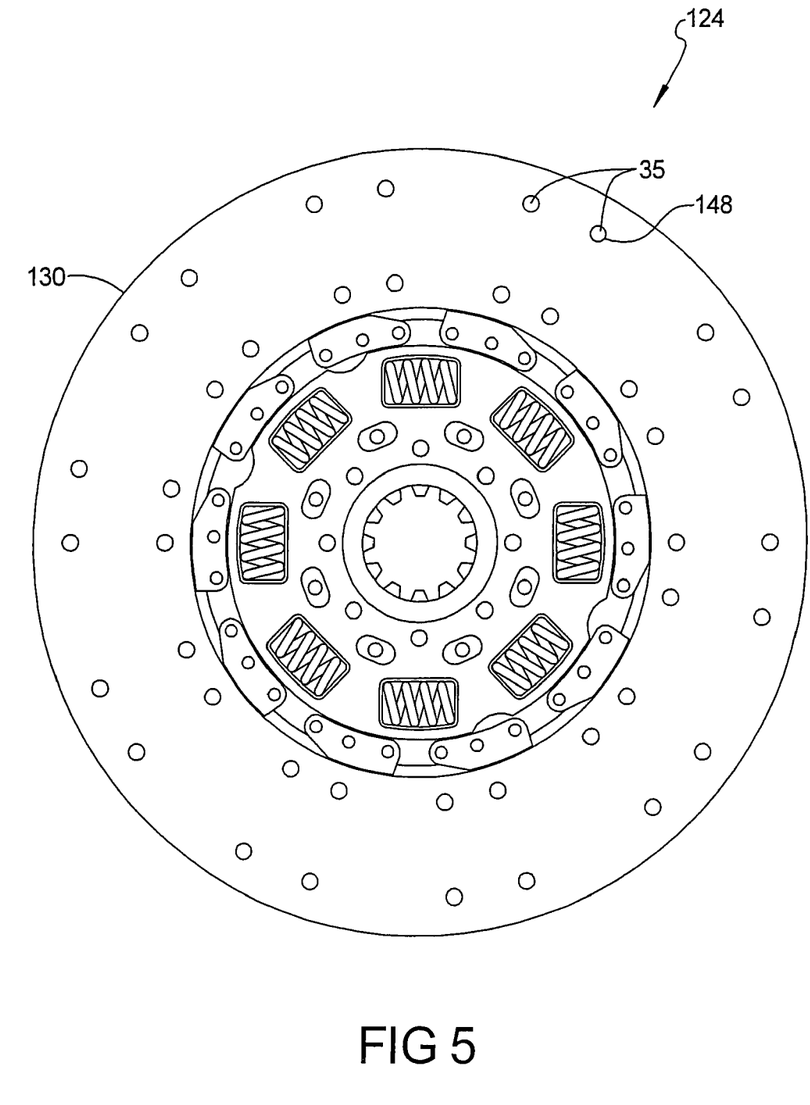
FIG. 5 is an end view of the clutch disc assembly of FIG. 4 in the direction of arrow 5.
Figure 6:
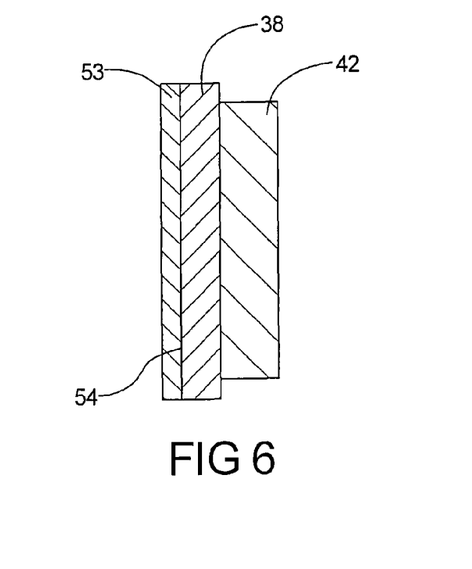
FIG. 6 is a sectional side view of a friction ring of FIG. 2 in the direction of arrows 6.

Referring now to FIG. 2, a partially exploded view of clutch disc assembly 24 is shown. As shown in FIG. 5, assembly 24 comprises three main sub assemblies: a clutch damper assembly 28, and first and second friction rings 30 and 32 respectively. Damper assembly 28 has a plurality of radially extending cushion elements 34 to which rings 30 and 32 are fixed by rivets 35.

First and second friction rings 30 and 32 each include first and second backer plates 36 and 38 respectively. Backer plates 36 and 38 are formed of steel. A plurality of first friction pads 40 are fixed to first backer plate 36, and a plurality of second friction pads 42 are fixed to second backer plate 38.

Clutch damper assembly 28 is typical of such assemblies found in clutches, and is not important in its details. Damping elements 44 in the form of springs are distributed circumferentially about assembly 28. Damping elements 44 are selected to cushion or damp out driveline torsional impulses when disc assembly 24 is clamped between pressure plate 26 and flywheel 12 in a clutch-engaged condition. Assembly 28 is configured to permit a limited amount of relative rotation between a splined hub 46 and friction rings 30 and 32. Hub 46 is slidably disposed on complementary splined input shaft 24 and rotates as a unit therewith. Friction rings are engaged by pressure plate 26 and flywheel 12 and rotate as a unit therewith in a clutch-engaged condition. Damping elements 44 are functionally disposed between hub and friction rings 30, 32 in a manner well known in the art to provide the desired isolation between the engine flywheel 12 and the transmission input shaft 20.

Cushion elements 34 are well known in the art and can be provide in a wide variety of forms. Cushion elements 34 are formed of steel and resiliently axially separate rings 30 and 32. The axially separation provisions a cushion effect on clutch engagement which aids in modulating clutch engagement to facilitate smooth clutch engagement. Alternative cushion element configurations equally suited to the purpose are readily found in the prior art. Both backer plates 36, 38 and cushion elements 34 have a plurality of aligned receiving apertures 48 and 50 respectively of slightly larger diameter than the body or shank of rivets 35 to enable the body but not the head of rivets to pass there through. Receiving apertures 50 through cushion elements in alignment with rivets 35 connecting first friction ring 30 to cushion elements 34 constitute a first set of receiving apertures in cushion elements. Receiving apertures 50 through cushion elements in alignment with rivets 35 connecting second friction ring 32 to cushion elements 34 constitute a second set of apertures. First and second engagement areas of cushion elements 34 are axially spaced from each other and are defined, respectively, by the areas most proximate to apertures 50 in alignment with apertures 48 of first friction ring 30 and with aperture 50 in alignment with apertures 48 of second friction ring 32. A plurality of clearance apertures 52, sized slightly larger than the heads or the formed upsets of rivets 35, are formed in backer plates 36 and 38. The clearance apertures 52 in the backer plates 36, 38 are in alignment with the aligned apertures of the opposite backer plate as best seen in FIG. 2. The clearance aperture 52 receives the rivet upset, or alternatively, the rivet head when the clutch disc assembly 24 is fully compressed in the axial direction.

Clutch friction material is commonly classified as either organic or ceramic. Alternative or equivalent characterizations of ceramic friction material are metallic and cerametalic. In this application, the term ceramic will be used generically for any friction materials in the clutch art which may be characterized as any of ceramic, metallic or cerametalic. Organic material is generally characterized as being easier to achieve modulated clutch engagements with. Ceramic material is generally characterized as being relatively difficult to achieve smooth clutch engagements with. Part of this difference may be attributable to the organic material generally being able to deflect more under the clutch engagement loads than the ceramic material. Organic material causes less wear of the engagement surfaces of the pressure plate and flywheel. Ceramic material is generally considered more wear resistant than organic material, and to enable a higher torque transmission capacity for a give diametral size and clamp load.

Figure 3:
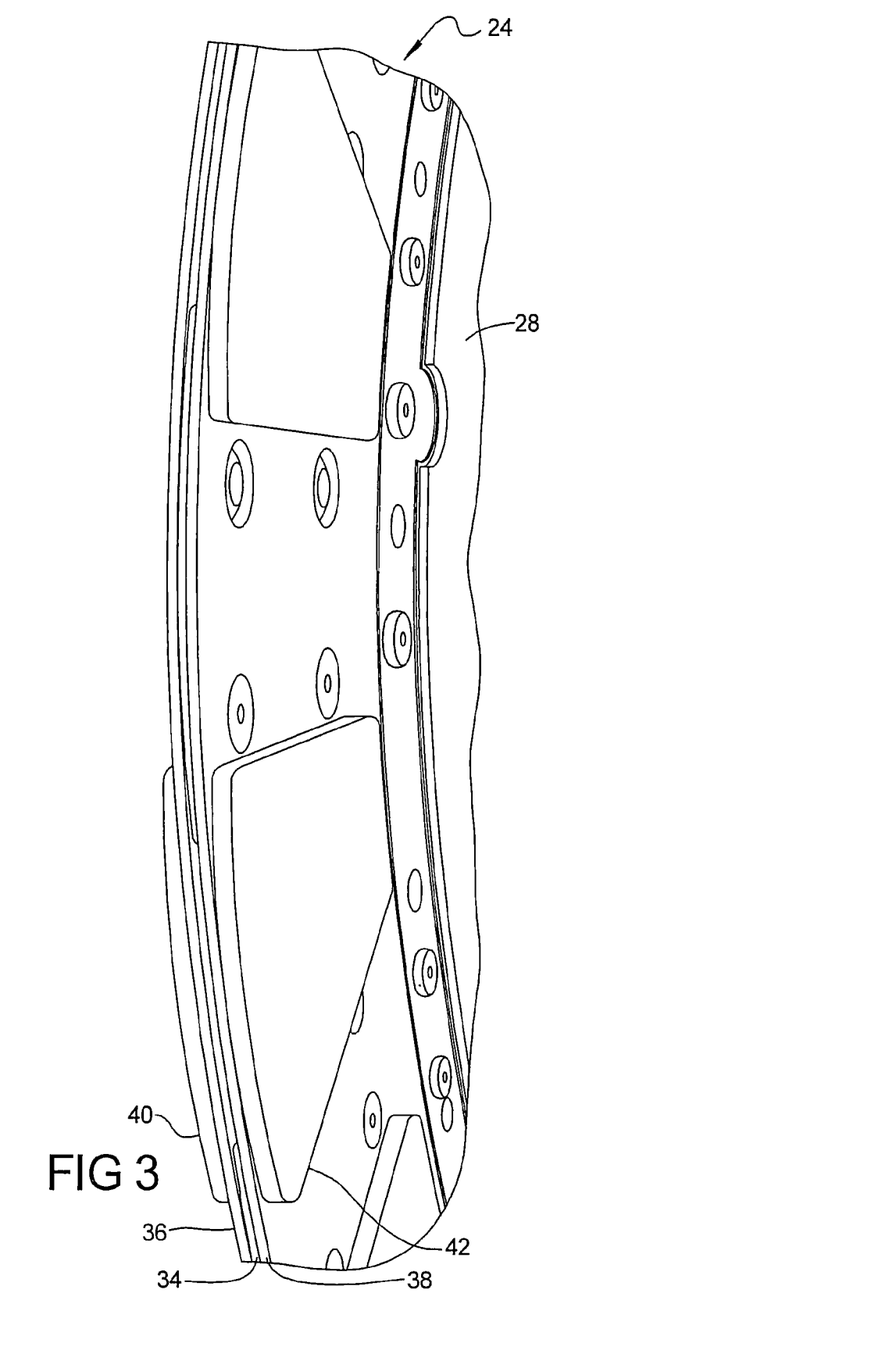
FIG. 3 is a close-up perspective view of the clutch disc assembly of FIG. 2.

The embodiment of FIGS. 1 through 3 has identical friction rings 30 and 32. Friction pads 40 and 42 are accordingly identical and are formed of ceramic material. Direct bonding of friction pads 40 and 42 to annular backer plates 36 and 38 results in a thinner driven disc and identical friction rings than that which is typical for cushioned ceramic material driven discs. Thinner disc assemblies 24 are possible because the rivets do not pass through the friction pads, and the friction pads 42 do not need to provide an engagement surface for rivets 35. The precise method of bonding is not critical to this invention. Two possible methods of bonding include applying a brazing paste to either the backer plates 36, 38 or the friction pads 40, 42 and heating an area of contact between the friction pads 40, 42 and the backer plates 36, 38 causing the brazing paste to liquefy and bond the friction pads 40, 42 to the backer plates 36, 38. Another method is to form the friction pads 40, 42 directly on the backer plates 36, 38 by depositing powdered friction material on the backer plates 36, 38 and subjecting the powdered friction material to heat and pressure so that the friction material sinters or fuses to the backer plates 36, 38 and forms the friction pads 40, 42. The powdered friction material is retained by forms during compression so it does not spread beyond the desired shape of the friction pads 40, 42.

Backer plates 36, 38 may be beneficially provided with a coat of insulating material 53 to reduce the frictional heat generated during clutch engagement transferred to the cushion elements 34. Excessive heating of cushioning elements can result in diminished cushioning capability. In one embodiment, the insulating material 53 is on a side 54 of the backer plate engaging cushion elements 34. The insulating material 53 needs to provide resistance to the transmission of heat, but needs not be especially resistant to stress. Insulating material 53 can include but is not limited to fiberglass, cork and any phenolic material. Additional insulation may be provided by insulating grommets disposed between the rivets and the joint between the facing and the cushion elements 34. The grommets could be in the form of a coating over the rivet.

Figure 4:
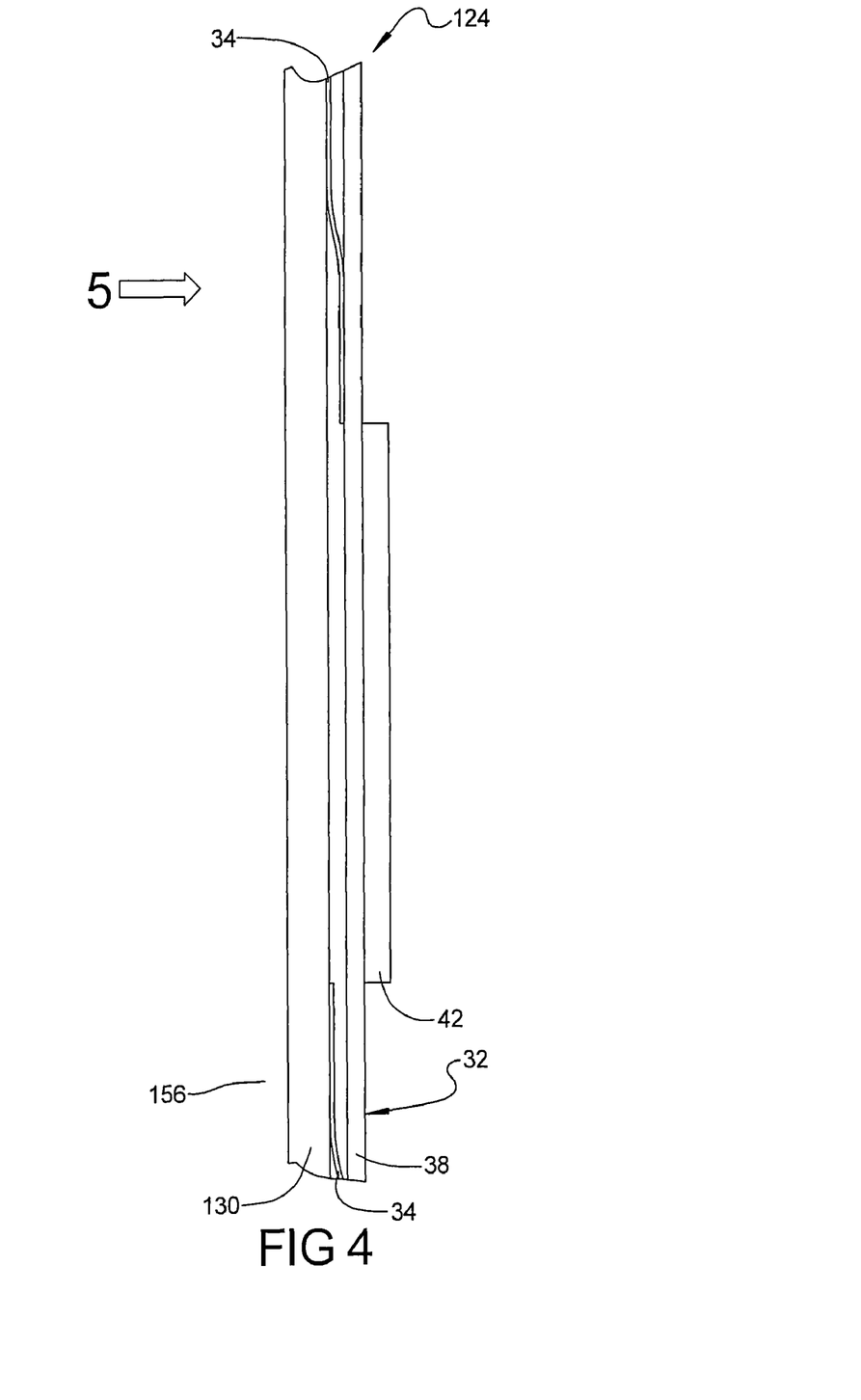
FIG. 4 is a close-up side view of a second embodiment of the present invention.

A second embodiment of the present invention, as best seen in FIG. 4 and FIG. 5, has organic facing material on a first side of 1 clutch disc assembly 124, and ceramic facing material on the second side of the driven disc. The organic facing material by itself defines a friction ring 130. Friction ring 130 has a plurality of circumferentially distributed receiving apertures 148. Friction ring 130 is riveted to engaging cushion elements 34 by rivets 35. Receiving apertures 148 are countersunk to enable the head or upset of rivets 35 to be disposed below an engagement surface 156 of friction ring 130. Alternatively, organic material ring 130 could be bonded to metal backer plate with receiving apertures passing through the backer plate and rivets 35 engaging the backer plate.

In the clutch assembly, driven disc 24 has its organic friction ring 130 disposed towards engine flywheel 12 and ceramic friction ring 32 disposed toward pressure plate 26. As a result of this orientation, the clutch advantageously provides engagement characteristics similar to those of a ceramic clutch, while the wear on the flywheel is the same as that of an organic disc. As a result, the pressure plate sustains more wear than the flywheel over the life of a flywheel disc. This allows a service technician to replace to replace the cover 14 and pressure plate 26 assembly, and to leave the relatively lightly worn flywheel 12 in place for continued service. This significantly reduces the effort needed to service a worn clutch.

Figure 7:
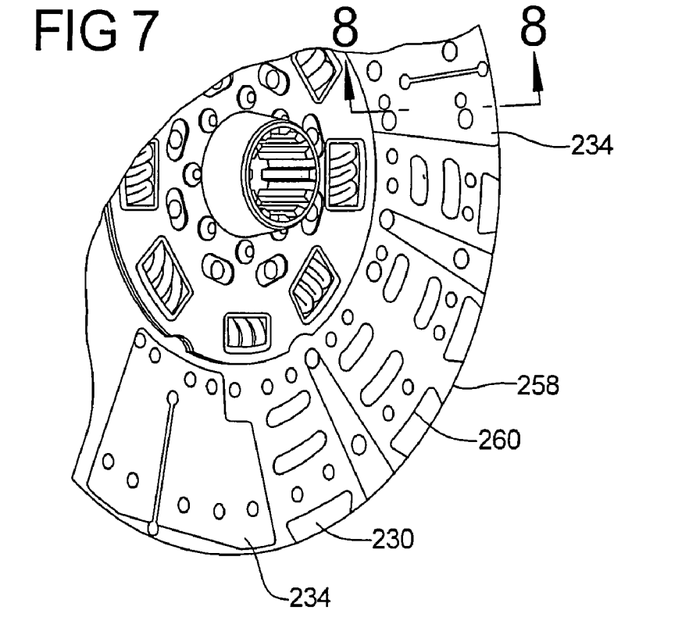
FIG. 7 is a partial angle view of an alternative embodiment a clutch disc assembly without one of its friction rings.
Figure 8:
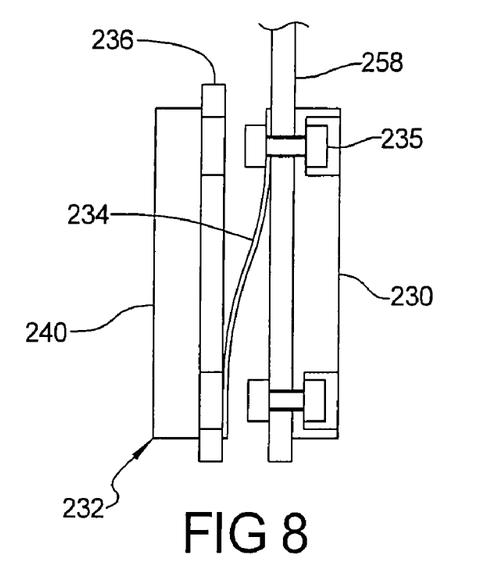
FIG. 8 is a sectional side view of the clutch disc assembly of FIG. 7 with both of its friction ring in the direction of arrows 8.

Yet another embodiment is shown in FIGS. 7 and 8. A perforated steel disc 258 extends radial from clutch damper assembly. An organic material friction ring 230 is fixed to a first side of the steel disc 258 by a plurality of rivets 235. A plurality of cushion elements 234 are fixed to the steel disc 258 on a side opposite the organic material friction ring 230. A ceramic material friction ring 232 comprising a steel backer plate 236 with ceramic friction material 240 disposed thereon is fixed to the cushion elements 234 opposite the steel disc 258 by rivets (not shown). The ceramic friction material 240 can be either in the form of pads or in the form of an annular ring. Balance weights may be selectively placed in dovetail shaped insert slots 260 within disc 258.

Direct bonding of ceramic friction material 240 to an annular steel ring instead of direct bonding friction material to smaller backer discrete arcuate elements which are in turn mounted separately to the clutch assembly, as done in the prior art, has several benefits. Discrete elements are more prone to hot spots and resultant warpage of the arcuate backer elements. Once source of hot spots will be the variation in displacement due to variation in the cushion elements. In a single arcuate ring, the variation is minimized because the unitary rings prevent any single cushion element from creating too much localized displacement. Additionally, having unitary rings results in a stronger structure for the clutch disc. The invention results in a more consistent cushion rate than with arcuate elements.

Figure 9:
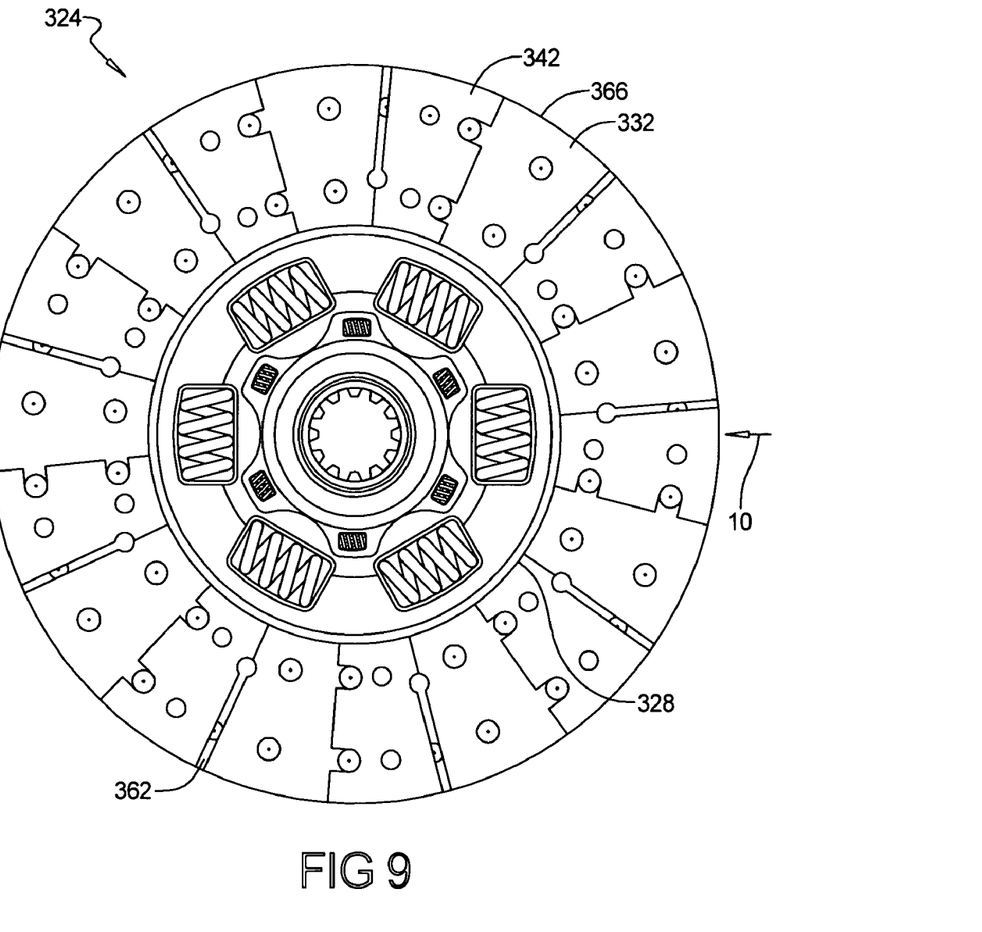
FIG. 9 is an end view of a clutch disc assembly with friction rings having keyhole slots.
Figure 10:
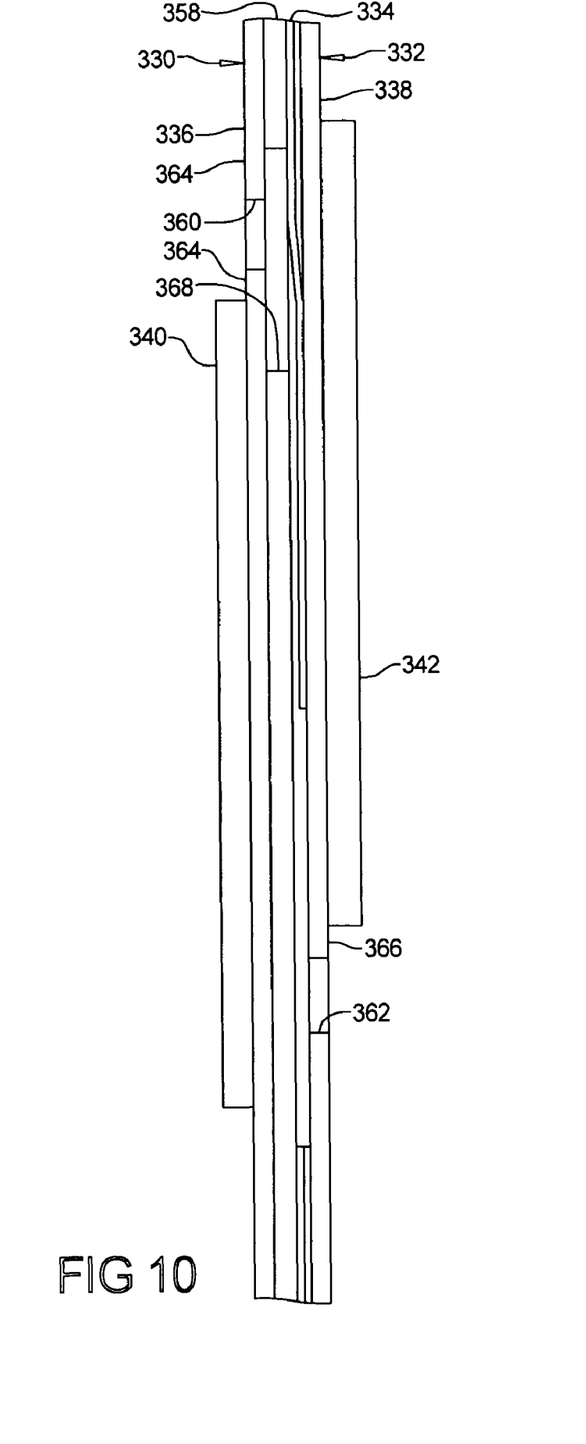
FIG. 10 is a is a broken-out side view of the disc assembly of FIG. 9 in the direction of arrow 10 showing a preferred cookie placement.
Figure 11:
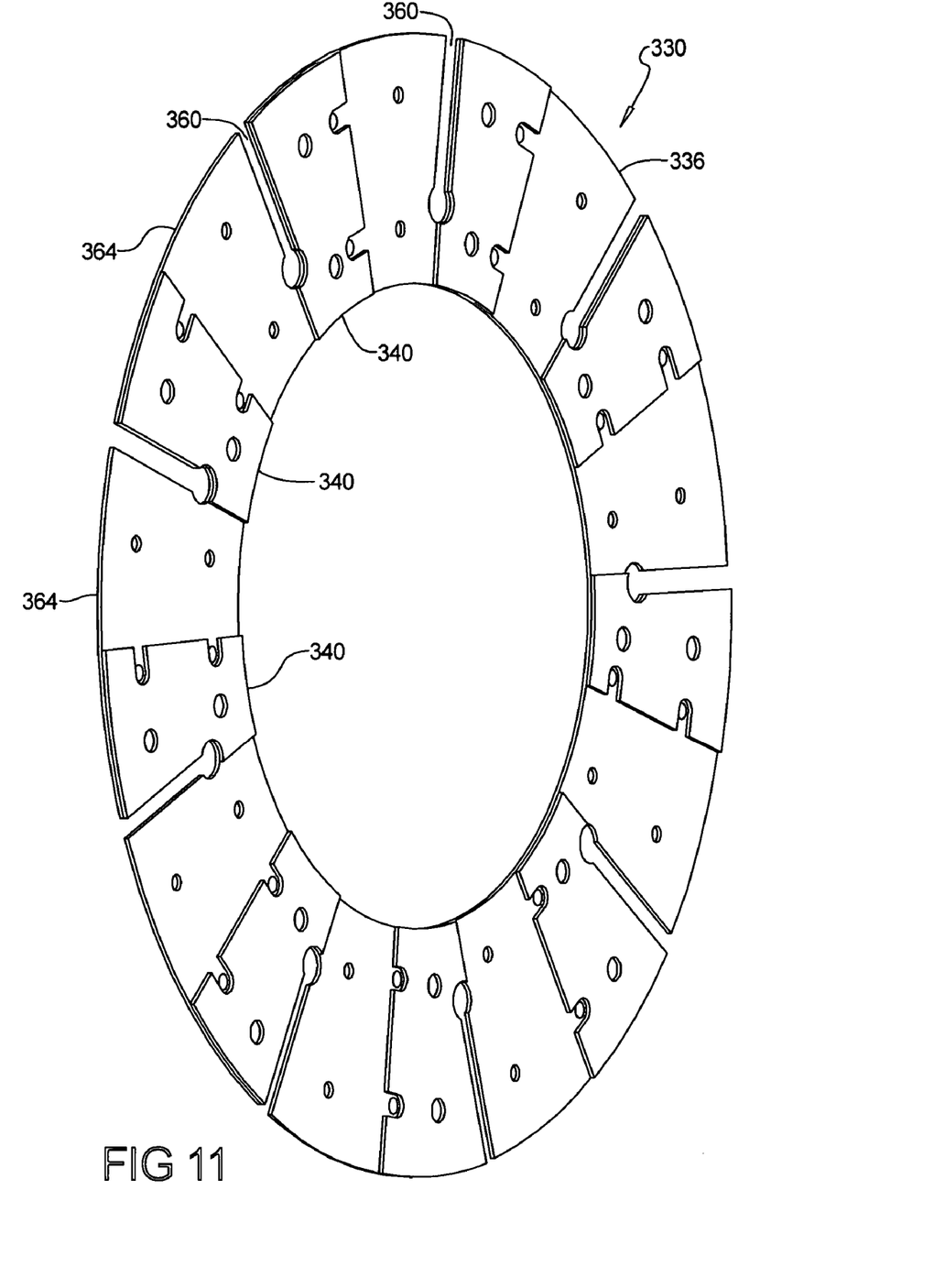
FIG. 11 is a perspective view of a friction ring of the clutch disc assembly of FIG. 9.

In another version of the present invention, best shown in FIGS. 9-11, a clutch disc assembly 324 has improved first and second friction rings 330 and 332 respectively which are beneficially oriented with respect to each other. Friction rings 330 and 332 have first and second keyhole slots 360 and 362 respectively separating direct bonded first and second friction pads 340 and 342 respectively.

Friction rings 330 and 332 are connected to a clutch damper assembly 328 by a steel disc 358, best shown in FIGS. 9 and 10. Disc 358 is incorporated into damper 328 in a manner well known in the art. The precise configuration of damper 328 may be consistent with the description of damper 28 but is not critical to the present invention. Friction ring 332 is connected to disc 358 indirectly, through a plurality of cushion elements 334 disposed therebetween. Cushion elements 334 are identical to or at least substantially similar to cushion elements 34 and 234. Cushion elements 334 could alternatively be placed between disc 358 and friction ring 330.

Friction rings 330 and 332 include first and second backer plates 336 and 338 respectively. Backer plates 336 and 338 are formed of steel. As shown in FIGS. 9-11, a plurality of first friction pads 340 are direct-bonded to first backer plate 336 and a plurality of second friction pads 342 are direct-bonded to second backer plate 338. Friction pads 340 and 342 are preferably formed of ceramic material. Bonding of the friction pads is consistent with the above description of bonding pads 40 and 42 to plates 36 and 38. It is appreciated that friction pads 340 and 342 could be alternatively fixed to backer plates 330 and 332 by riveting in place of direct bonding. The friction material alone could be riveted to backer plates 330 and 332, or first mounted on smaller localized backer plates (not shown) which would in turn be fixed by rivets to backer plates 330 and 332. Backer plates 336 and 338 each have a plurality of first and second arms 364 and 366 separated by keyhole slots 360 and 362 respectively. Slots 360 and 362 are open at their ends. Pads 340 are mounted on arms 364 with one edge proximate to and conforming to the shape of adjacent slots 364. In one embodiment, the trailing edge of friction pads 342 on a cushion-side of backer plate 338 is proximate to slot 362. As shown in FIGS. 9 and 10, pad 340 occupies about half of the area of first arm 364, extending from an inner diameter to an outer diameter of plate 336 and extending circumferentially from one of slots 360 approximately half way to the next slot 360. Pads 340 and 342 can be either wider or narrower. As readily seen in FIGS. 9 and 11, finger slots expand at their base or root giving the slots 360 and 362 their characteristic keyhole shape. Beneficial effect is illustrated by testing data. Friction pads 340 and 342 are provided with clearance apertures to accommodate rivets, but are not retained or engaged by rivets.

A significant benefit of direct bond and key hole shaped slots in combination is increased energy absorption with decreased warpage. Total or near total overlap of friction pads 340 and 342 as best shown in FIG. 10 is believed to beneficially contribute to the decreased warpage. Although not easily discerned from the figures, friction pads 340 and 342 are also in alignment with cushion elements 334, with the number of cushion elements 334 equal to the number of friction pads on each of friction rings 330, 332 (consistent with the structure of FIG. 2 which shows an unslotted friction ring having ten friction pads 42 and 10 cushion elements 34). While nine friction pads/slots/arms/cushions are shown, more or fewer may be employed. The outer diameter of assembly 324 has multiple layers best shown in FIG. 10, with the layers from side to side consisting of: first friction pads 340 direct bonded to first backer plate 336 which incorporates keyhole slots 360, the backer plate 336 is riveted to disc 358 which connects to clutch damper assembly 328; a plurality of cushion elements are riveted to disc 358; second backer plate 338 is riveted to cushion elements 334, and second friction pads 342 are direct bonded to second backer plate 338. Disc 358 may have a plurality of slots 368 equal in number to the slots 360 and 362 in backer plates 336 and 338 as shown for disc 258. The radius at the bottom of the disc slots of disc 258 is not of the keyhole type, but could be. Test data confirms the effectiveness of this arrangement assembly. A disc assembly having no slots in the backer plates 36 and 338 absorbed a total of 1800 BTU before it was significant damaged. A disc assembly 358 as described above with slots 360 and 362 absorbed a total of 30,900 BTU without suffering significant damage.

In an alternative structure, not illustrated, disc 358 is of a much smaller diameter so that friction rings 330 and 332 do not overlay disc 358. Friction rings 330 and 332 attach directly to cushion elements 334 which in turn are riveted to an outside diameter of disc 358 similar to the arrangement shown in FIG. 2.

The foregoing discussion discloses and describes the preferred embodiment of the present invention. However, one skilled in the art will readily recognize from such discussion and the accompanying drawings and claims that various changes, modifications and variations can be made therein without departing from the true spirit and fair scope of the invention as defined in the following claims.

We claim:

1. A clutch disc assembly for a friction torque device, comprising:
   a clutch damper assembly including a hub defining an axis of rotation and including a concentric steel disc and including a plurality of damper springs disposed between the hub and the steel disc;
   a first friction ring rotatively fixed to the steel disc concentric with the axis of rotation including a first steel backer plate and the first steel backer plate having a first plurality of keyhole slots radially extending from a location proximate to an inside diameter of the first backer plate to and through an outside diameter of the first backer plate and defining an equal plurality of arms and having an equal plurality of friction pads with one friction pad fixed to each arm on a side opposite the steel disc;
   a second friction ring rotatively fixed to the steel disc concentric with the axis of rotation including a second steel backer plate and the second steel backer plate having a plurality equal in number to the first plurality of keyhole shaped slots radially extending from a location proximate to an inside diameter of the second backer plate to and through an outside diameter of the second backer plate and defining an equal plurality of arms and having an equal plurality of friction pads with one friction pad fixed to each arm on a side opposite the steel disc with the first friction pads and the second friction pads being in substantial alignment; and
   a plurality equal in number to the first plurality of cushion elements fixed to the steel disc and axially disposed between the friction rings;
   wherein the steel disc extends radially between the first and second friction rings and is axially disposed between the cushion elements and one of the backer plates, and has a plurality of slots equal in number to the first plurality.

2. A clutch disc assembly for a friction torque device, comprising:
   a clutch damper assembly including a hub defining an axis of rotation and including a concentric steel disc and including a plurality of damper springs disposed between the hub and the steel disc;
   a first friction ring rotatively fixed to the steel disc concentric with the axis of rotation including a first steel hacker plate and the first steel backer plate having a first plurality of keyhole shaped slots radially extending from a location proximate to an inside diameter of the first backer plate to and through an outside diameter of the first backer plate and defining an equal plurality of arms and having an equal plurality of friction pads with one friction pad fixed to each arm on a side opposite the steel disc;
   a second friction ring rotatively fixed to the steel disc concentric with the axis of rotation including a second steel backer plate and the second steel backer plate having a plurality equal in number to the first plurality of keyhole shaped slots radially extending from a location proximate to an inside diameter of the second backer plate to and through an outside diameter of the second backer plate and defining, an equal plurality of arms and having an equal plurality of friction pads with one friction pad fixed to each arm on a side opposite the steel disc with the first friction pads and the second friction ads being in substantial alignment; and
   a plurality equal in number to the first plurality of cushion elements fixed to the steel disc and axially disposed between the friction rings, and
   the steel disc having a smaller outside diameter than an inside diameter of the first and second backer plates, and the backer plates are connected directly to the cushion elements.

\* \* \* \* \*